Patented Aug. 31, 1937

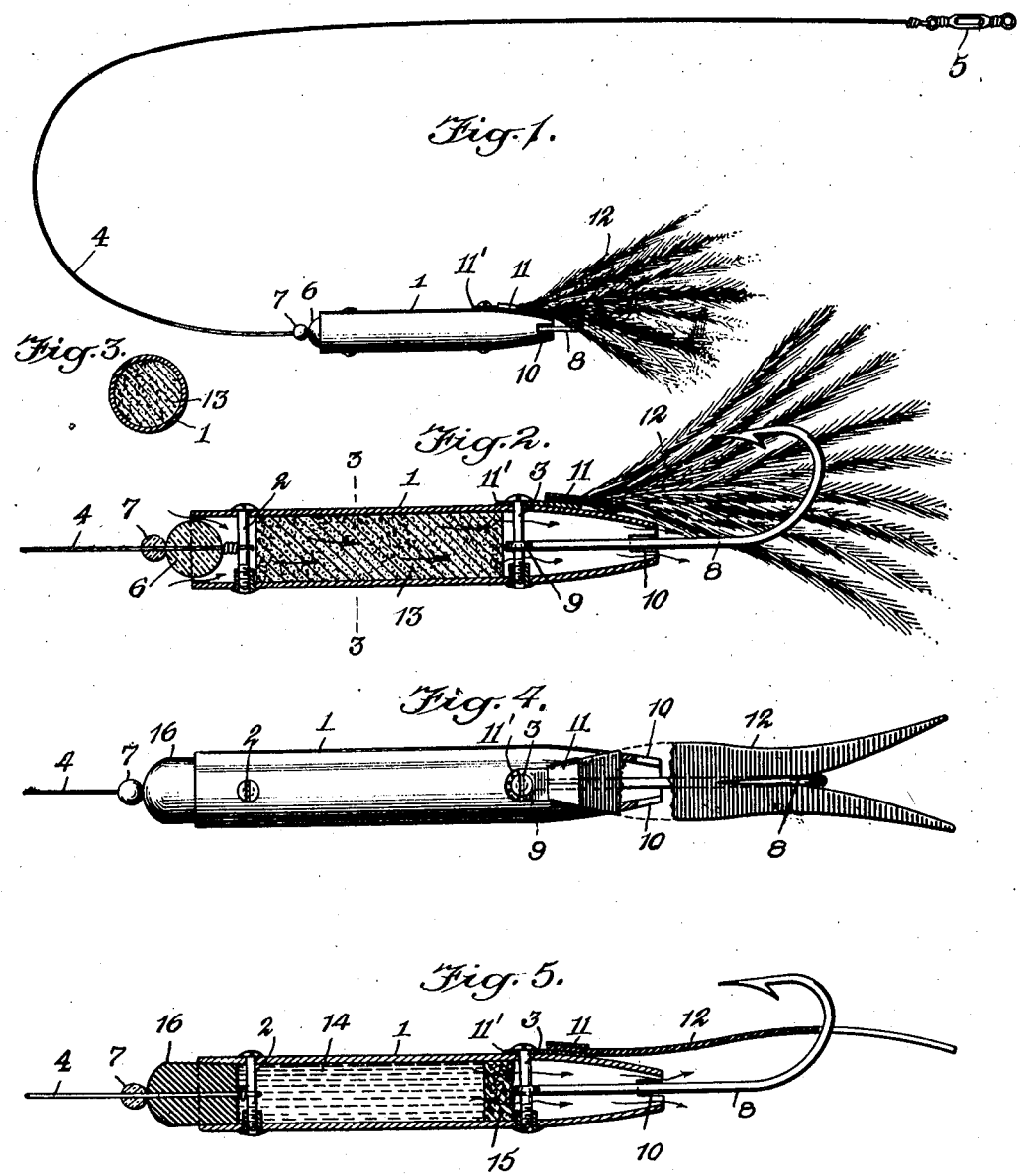

2,091,457

UNITED STATES PATENT OFFICE 2,091,457

FISH LURE

Rudolph Sauer, Hollis, N. Y.

Application April 26, 1935, Serial No. 18,463
Renewed January 15, 1937

3 Claims. (Cl. 43—42)

This invention relates to fish lures, generally known as a squid or jig. An object of the invention is to provide such a lure, which causes what is generally known as a slick, to trail after the lure.

More specifically, the invention includes a receptacle in which bunker oil or other suitable liquid is stored and which escapes from the lure as the lure moves through the water, thus exuding an essence for over a period of time forming a slick or train of essence to attract the fish and leading them to the hook of the lure. The liquid employed may, of course, be varied but it is believed desirable to have such liquid in the form of an oil which will float on the water and provide a stream or line of oil which, when a fish crosses the same or comes in contact therewith, will be followed by the fish who will strike at the lure.

With these and other objects in view, the invention consists of certain novel features of construction and combinations and arrangements of parts, all of which will be more fully hereinafter described and pointed out in the claims.

In the accompanying drawing:

Figure 1 is a view in elevation illustrating one form of my improved lure;

Figure 2 is a view in longitudinal section through the lure;

Figure 3 is a view in transverse section on the line 3—3 of Figure 2;

Figure 4 is a view mainly in elevation but partly broken away, illustrating a modified form of lure;

Figure 5 is a view in longitudinal section of the lure shown in Figure 4.

1 represents the body of the lure which constitutes a receptacle and is preferably of cylindrical form throughout the major portion of its length but has its rear end preferably made of frusto-conical shape.

In the body 1, two pins, 2 and 3 respectively, are secured. The pin 2 is located adjacent to the forward end of the body and the pin 3 at a point removed from the rear end of the body. These pins may be variously made but I have illustrated for the purpose pins which are removable and constitute separable screw-threaded rivets. A leader 4 is secured to the forward pin 2 and is provided at its free end with the ordinary swivel 5. On this leader 4 I locate a bead 6 which is of slightly less diameter than the internal diameter of the forward end of the body, so that while the bead is normally located in the open end of the body, it does not completely close the same but allows the water to flow into the body around the bead. Another bead 7 may also be located on the leader and this bead may be brightly colored as desired.

A hook 8 projects from the rear end of the lure and the pin 3 projects through the eye 9 of the hook so that the hook is permitted a certain amount of lateral movement and to augment this movement the sides of the lure at its rear end are provided with recesses or slots 10.

Any suitable form of streamer 12 may be secured to the body of the lure. In Figures 1 and 2 of the drawing, I illustrate the streamer as consisting of a cluster of feathers which are fastened to a clamp 11, and this clamp has a perforated tongue 11' thereon receiving the pin 3 so that by removing the pin the streamer can be removed and replaced. The modification in Figure 4 of the drawing illustrates the streamer 12 as a single strip of suitably shaped material.

In the body 1 I preferably locate an absorbent material 13 which may consist of candlewick or any other suitable material which can be saturated with oil. When the lure is drawn through the water in trolling or jigging, the water flows through the body of the lure and is more or less impregnated with the oil to leave a slick behind the lure for the purpose above stated. The lure can be dipped into a container to saturate the composition 13 as often as may be necessary.

In the modification illustrated in Figures 4 and 5 of the drawing, I provide a liquid 14 in the body 1 of the lure and locate a section of absorbent material 15 in the body adjacent the pin 3 which holds back the liquid but allows a certain amount to seep through and escape through the rear end of the lure. The forward end of the lure is closed by a removable plug 16, which fits snugly in the forward end of the lure, but slides freely on the leader 4.

While I have illustrated what I believe to be preferred embodiments of my invention, it is obvious that various slight changes might be made in the general form and arrangement of parts described without departing from my invention, and hence I do not limit myself to the precise details set forth but consider myself at liberty to make such changes and alterations as fairly fall within the spirit and scope of the appended claims.

I claim:

1. A fish lure including a tubular body, two cross pins in the body, one in the forward end thereof and the other near the rear end, a leader connected to the forward pin, a hook connected to the rear pin, means in the body to house a liquid which escapes from the rear end of the body, and a bead on the leader partially closing the forward end of the lure.

2. A fish lure including a body constituting a receptacle for liquid, an absorbent plug at the rear portion of the body through which the liquid flows into the water, a leader connected to the forward portion of the body and a plug on said leader normally closing the forward end of the body.

3. A fish lure including a hollow body of general cylindrical form adapted to contain a liquid and discharge the liquid from the rear end thereof when the lure is drawn through the water and the water passes through the body of the lure, a leader and a hook operatively associated with the body, a device on the leader partially closing the forward end of the body, and means in the body partially retarding the escape of liquid when the leader is drawn through the water and the water moves through the body.

RUDOLPH SAUER.